April 19, 1938. J. R. URSCHEL 2,114,730
BEAN SNIPPER
Filed Sept. 23, 1935 3 Sheets-Sheet 1
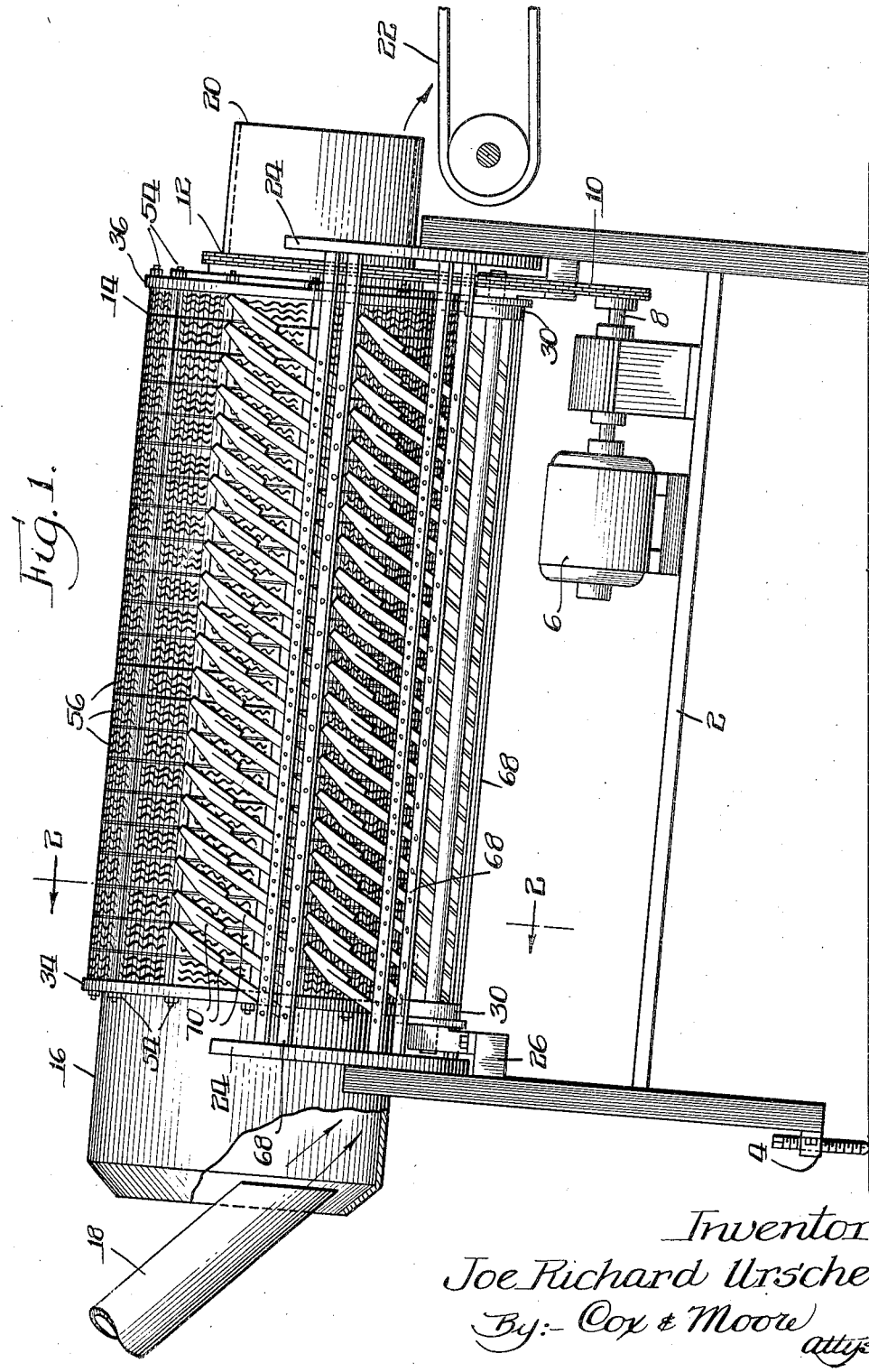
Inventor:
Joe Richard Urschel
By:- Cox & Moore
attys.

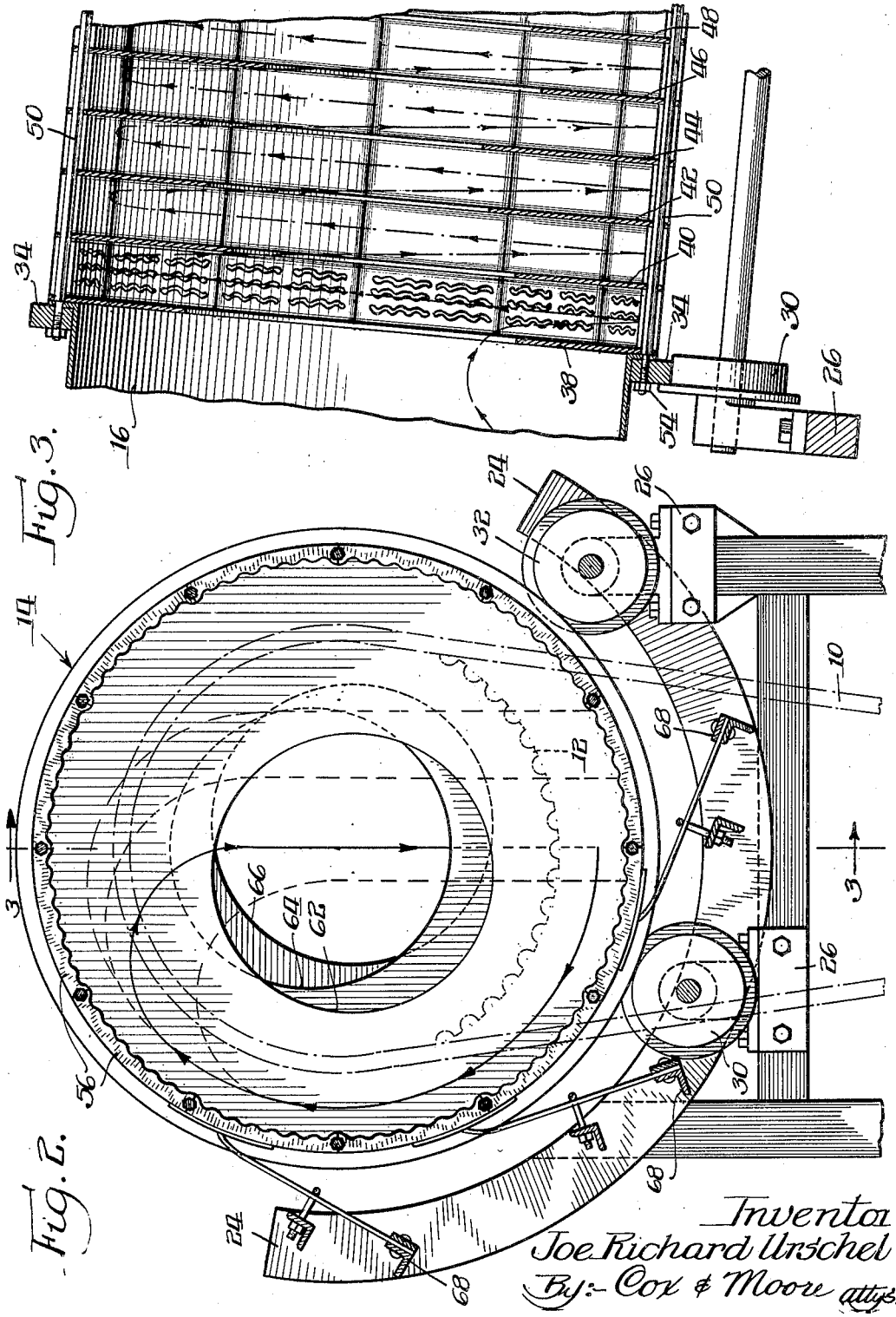

April 19, 1938. J. R. URSCHEL 2,114,730
BEAN SNIPPER
Filed Sept. 23, 1935   3 Sheets-Sheet 3
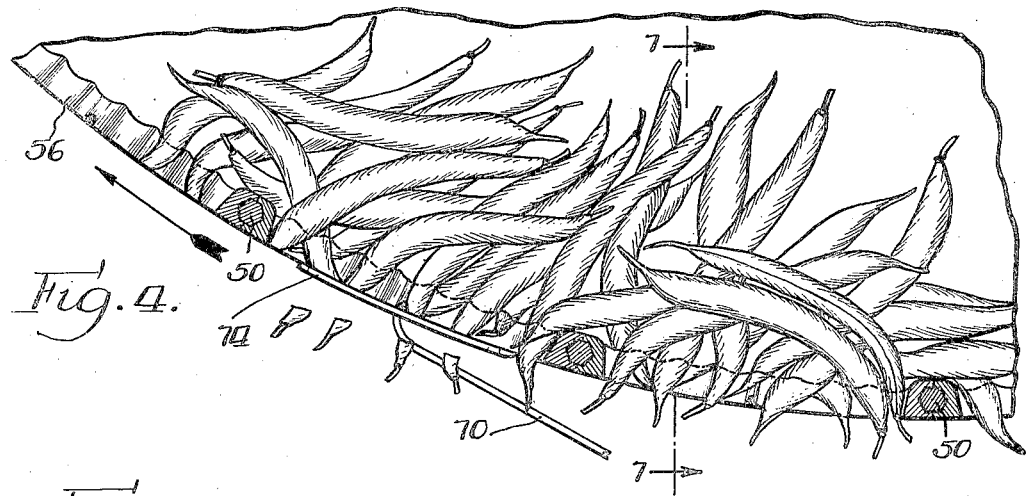
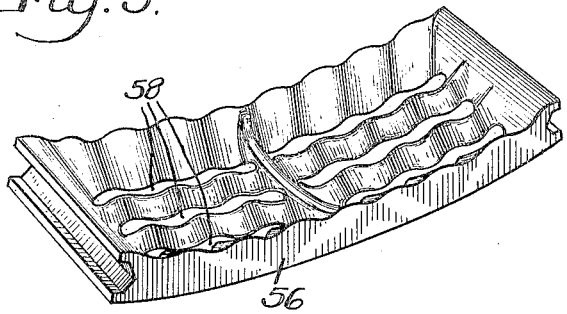
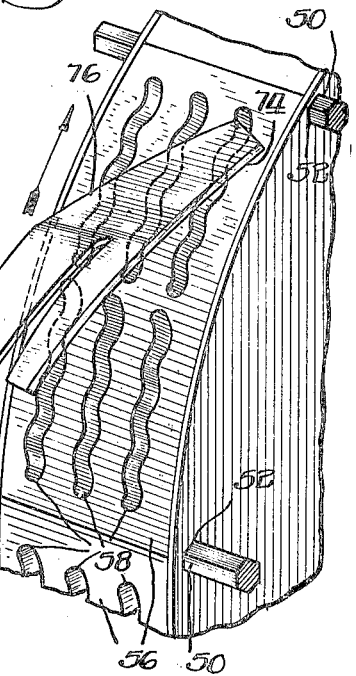
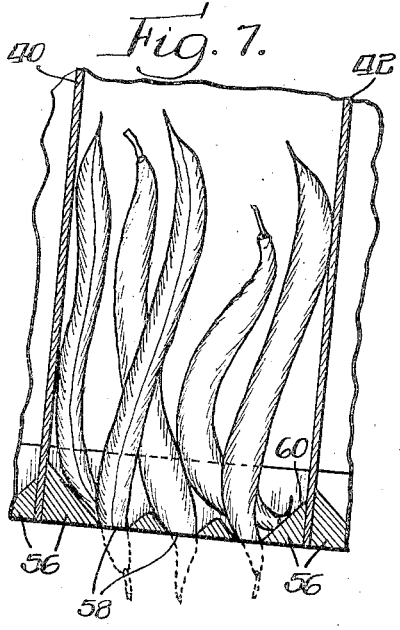
Inventor:
Joe Richard Urschel
By:— Cox & Moore
attys.

Patented Apr. 19, 1938

2,114,730

UNITED STATES PATENT OFFICE 2,114,730

BEAN SNIPPER

Joe Richard Urschel, Valparaiso, Ind.

Application September 23, 1935, Serial No. 41,660

15 Claims. (Cl. 146—86)

This invention relates in general to bean snippers, and in particular relates to a machine for receiving string beans and for automatically snipping the ends thereof.

Among the central objects of my invention are to provide such a device wherein a moving carrier is provided with openings in the walls shaped to permit the maximum number of bean ends to project therethrough so that the projecting ends can be snipped off in any desired manner; to provide a new type of opening in the wall of the bean carrier comprising a substantially zig zag or wavy shaped opening of uniform cross sectional dimension, whereby the maximum number of bean ends can project through the walls of the carrier, while at the same time precluding the possibility of the sides of the beans projecting through the slots and thereby consequently preventing the sides of the beans being damaged or cut; to provide a peculiar type of bean end opening which will permit the projection of the maximum number of bean ends into cutting position while precluding the possibility of cutting the sides of the beans; to provide a new type of bean projecting opening of wavy, uniform cross section in combination with a stationary knife disposed in the path of the moving projecting bean end, and wherein the knife is disposed diagonally in the path of movement of the bean to effect a slicing action thereon; to provide such a knife which is light in weight and which is resiliently pressed against the traveling wall of the bean carrier so that in the event of a nail or other hard object coming into contact with the knife, the knife will be permitted to retreat from the cylinder with the minimum of effort and with the minimum of jarring injury to the co-operative cutting members; to provide a rotating cylinder having means for feeding a mass of beans in a plane at right angles to the axis of rotation of the bean feeding cylinder, and wherein a plurality of knives are disposed in successive spaced apart relation with respect to the path of movement of the beans, whereby as the beans travel in such circular path and are constantly shifting in position, bean ends not presented to the first knife of the series, due to their constantly shifting positions, as they move, will have the opportunity to be presented to successive knives of the series; to provide a bean containing magazine or carrier or cylinder, preferably of the rotatable type, disposed at an adjustable inclination to the horizontal to provide a downward tilt from the feeding-in end of the cylinder to the discharge end of the cylinder, and wherein the cylinder has its circumferential or peripheral walls formed with bean projecting openings provided along its interior walls with a series of spaced apart collars or circular baffles forming therebetween circular bean pockets, and wherein the central openings of these collars, disks or baffles communicate, and wherein the inner edges thereof are in non-registering relation, by which construction, as the cylinder rotates, a mass of beans in any one pocket tends to wedge between the opposed walls of the baffles forming the pocket, and whereby the beans are carried substantially upwardly in a circular path and during such movement the individual beans turn and move to present new ends to the openings for projection therethrough, and wherein by means of such bodily upward movement of the mass of beans, a certain percentage of the same, on reaching the upper portions of the cylinder will drop or fall by gravity, and due to the downward inclination of the cylinder will fall into the next forward bean pocket, in which a separate mass of beans is likewise being carried upwardly in an arcuate path and a portion of which are likewise falling into the next forward pocket, where in said successive pocket the beans will, in a similar manner, be carried upwardly and be projected by gravity into the next succeeding pocket, by which manner the beans are fed through the machine, and as they are so fed will have their ends snipped off; to provide bean carrying pockets of the foregoing character wherein a positive means, such as a spiral pocket or positive bean feeders are eliminated for feeding the beans longitudinally through the machine; to provide bean feeding pockets and bean cutting pockets of the foregoing character which will permit the snipped beans to move through the compartments more quickly than the unsnipped beans, whereby the unsnipped beans will remain in any particular pocket for a longer period of time and hence will have greater opportunity to have their ends snipped; to provide bean snipping pockets of the foregoing character which will prevent the passage of unsnipped beans directly across the edge surfaces of the baffles and thus be discharged from the machine without having their ends snipped; to provide a feeding construction for bean snipping machines, whereby the beans will progress through the machine at a substantially uniform rate of progress; to provide a construction of the foregoing character wherein the tilt or slope of the axis of the bean cylinder may be adjusted to regulate the feed of the beans through the machine; to provide a bean feeding arrangement for bean snipping machines having rotatable bean carrying cylinders wherein shorter cylinders may be used as compared with the older type of machines, and wherein the shorter beans will move through the cylinder more rapidly than the longer beans, due to the difficulty of the longer beans falling downwardly into the next forwardly disposed pocket; to provide these and other objects of invention which will be apparent from a perusal of the following specification, when taken in connection with the accompanying drawings, wherein:

Fig. 1 is a side elevational view of my improved bean snipping machine.

Fig. 2 is a vertical cross sectional view taken on the line 2—2 of Fig. 1.

Fig. 3 is a sectional view of the feed end of a rotating cylinder, the section being taken on the line 3—3 of Fig. 2.

Fig. 4 is a partial section of the cylinder showing the manner in which the beans are arranged therein and snipped by the cutting knives.

Fig. 5 is a detail perspective of one of the segments which make up the cylinder.

Fig. 6 is a partial perspective more particularly showing the manner of co-operation between the cutting knife and the cylinder, and Fig. 7 is a section on the line 7—7 of Fig. 4.

In general, my improved bean snipping machine comprises in its preferred form a rotating cylinder which is adjustably tilted at an angle to the horizontal, the in-feeding end of the cylinder being higher than the discharge end. Within the cylinder is disposed a series of spaced apart collars, the outer edges of which are united to the inner wall of the cylinder and the inner circular edges of which provide an opening centrally of the longitudinal axis of the machine cylinder, and wherein the inner edges of the collars are out of registration, thereby providing a staggered arrangement of spaced apart circular baffles, forming therebetween bean holding and bean feeding pockets. The peripheral walls of the cylinder forming the curvilinear portions of these pockets are provided with bean snipping openings which are of peculiar shape, being substantially zig zag or wavy in shape, and wherein the openings are of uniform width or cross section. By providing the wavy shape, any possibility of a bean lying flat-wise or longitudinally of the opening with the side of the bean sticking therethrough sufficiently to be cut, is eliminated, and by making the cross section of the wavy shaped opening uniform, the maximum number of bean ends may project through the openings or, in short, there is no part of the opening through which a bean end may not project and there is no part of the opening through which the side of the bean may project. In conjunction with these openings, and arranged within the path of travel of the bean ends projecting therethrough, I provide one or more, and preferably a series of stationary knives which are adapted to lie flat against the traveling surface of the cylinder and preferably at a diagonal angle thereto, so that slicing action is provided, so that as the beans are wedgingly carried between the opposed baffle walls of the pockets, they will be moved upwardly past the series of spaced apart knives and during this movement may shift in the pockets to present new ends to the bean openings and, in addition, by means of the wedging action of the mass of beans in the pocket, the beans as a whole and as a mass will be carried upwardly by the rotating cylinder so that a percentage of the beans, on reaching the upper portion of the cylinder, will drop vertically downwardly and, due to the tilt of the cylinder, a percentage will fall into the next feed pocket where the action will be repeated, and thus a certain percentage of the beans is constantly being fed through the cylinder to the discharge end. By regulating the tilt of the cylinder the rate of passage of the beans through the machine is controlled, and by staggering the inner edges of the baffles, the direct passage of the bean across the inner edges of the baffles is precluded. By reason of the general construction, the snipped beans may travel faster through the machine since they are shorter and will be less impeded by the baffles than the unsnipped beans, and whereby the unsnipped beans will be retained in the pockets a longer time and will have greater chance to be snipped. In addition, I form the stationary knives of relatively light construction and have resiliently mounted them so that they press resiliently against the outer traveling surface of the cylinder, by which action a quicker retreat of the knife from the cylinder is permitted when nails or other hard objects come in contact with the knives, and whereby the bean cutting edges are less likely to be damaged. By the provision of a machine of the foregoing construction, I am able to use knives which will produce a slicing action but which knives may retreat with speed should they come in contact with nails or other hard objects.

With respect to the preferred embodiment of my invention, it will be seen that I have provided a stand of any desired character 2, having an adjustable means 4 for raising one end thereof to adjust the tilt of the rotating cylinder. The base 2 forms a platform for a motor 6 driving a shaft 8 having a sprocket carrying a chain 10, which chain passes over a sprocket 12 rigidly fastened to the bean carrying cylinder 14, whereby to rotate the cylinder as hereinafter described. The entering or higher end of the cylinder is provided with a laterally extending circular spout 16, the open end of which receives a bean chute 18 to permit beans to be fed and taken into the hopper 16. The discharge end or lower end of the cylinder 14 is provided with a discharge hopper or spout 20 which, in turn, discharges upon a traveling belt 22 of any desired character. The stand 2 is provided at each end with a cradle or track 24 of semi-circular formation which forms a carrier or mounting for the knife blades hereinafter described. In addition, the frame 2 is provided with suitable bearing blocks 26 and 28 upon which are loosely mounted rollers 30 and 32 upon circular tracks 34 and 36, respectively, which tracks are rigidly assembled to the bean carrying rotatable cylinder.

The rotatable cylinder is preferably formed of a series of inter-connecting compartments or bean pockets. In the preferred construction, these bean pockets are formed of opposed circular disks or collars which clamp therebetween the circumferential inter-locking series of segments of the general shape shown in Fig. 6. These segments interlock and inter-fit to provide a continuous peripheral wall for each bean pocket, the sectional walls lying between and being clamped between two opposed plates or collars. The collars are shown in Fig. 3, as at 38, 40, 42, 44, 46, 48, etc. Each plate is provided with a plurality of registering openings 50 adapted to receive therethrough angularly disposed locking rods 52. The holes of the successively spaced apart plates or disks being in alinement, receive therebetween the longitudinal locking bolt 52 for holding all of the plates in assembled relation with the sections in locking relation therebetween. Each one of these locking rods 52 is provided on its opposite end with a threaded portion which projects through the track 34 and is locked in position by means of a nut 54.

Each section, as shown in Fig. 6, is provided on its end with a recess shaped to accord with half of the cross sectional dimension of the locking member 52, so that when two adjacent sections are put end to end with the locking rods 52 passing therebetween, as shown clearly in Fig. 4, and with the end plates clamped in position, the sections will be firmly held in position and will form a continuous peripheral wall.

Each section 56 is provided with a plurality of elongated openings 58 of wavy or substantially zig zag outline, the openings of which are of uniform width or cross section; in short, the width of any portion of one of these wavy slots 58 is equal to the width of any other portion; and the width is selected so that the desired amount of bean end may project therethrough into the path of the slicing knives, as shown in Figs. 4 and 7; whereas, the width of such a slot 58 is selected so as to preclude any bean lying longitudinally therein and having its side wall project through such opening, thereby precluding sides of the beans from being sliced by the knives. In addition, the inner walls 60 of these sections are slopingly arranged so as to deflect the bean ends into the openings.

Referring to Figs. 2 and 3, it will be noticed that the inner peripheral edges of the spaced apart collars or plates 38 to 48, inclusive, are disposed in staggered relation. This is represented in Fig. 2 by the lines 62, 64, 66, etc. Were these edges not arranged in such staggered relation, that is, were these edges in registration, long beans could lie across or straddle these edges and in the rotation of the cylinder would pass directly to the discharge end without ever falling into the bean pockets so that the ends of the beans could be snipped. In addition, this construction necessitates the longer beans remaining in any particular pocket and thereby improving their chances of having their ends snipped.

Upon the stationary cradle 24 I mount a series of knife carrying brackets 68, preferably three in number. These brackets are arranged to clampingly receive the ends of relatively light, elongated, spring metal knives 70. If desired, intermediate the ends of the knives I provide a staple 72 for preventing sidewise movement of the knife. Each knife is of the general construction shown in Fig. 7. It is provided with a diagonal cutting edge 74 which lies flatwise against the smooth traveling outer wall of the cylindrical bean pocket, and this cutting edge is of sufficient width to overlap or overlie the series of three spaced apart slots 58 in each section. By reason of the diagonal arrangement of the cutting edge 74 with respect to the direction of travel of the longitudinal wavy slots 58, a slicing action by means of a stationary knife is provided. In addition, by forming the stationary knives 70 of light spring metal, I provide a construction whereby when nails or other hard objects pass through the slots into contact with the knives, the knives may quickly and easily be pressed back from the outer wall of the drum surface and may quickly return to cutting or slicing position. It will be noticed by reference to Fig. 7, that the rearmost portion 76 of the cutting edge is relieved or raised out of the plane of the traveling cylinder so as not to scrape along the outer wall thereof.

In the operation of my device, by reason of the plurality of circular pockets formed by the adjacent pairs of side plates or collars, the mass of beans, when fed into the cylinder, will pass into the feed pocket and will be wedged in masslike formation therein. Due to the wedging action of the beans between the side plates, they will be carried upwardly in mass formation as the cylinder rotates, as shown in full arrowed line in Fig. 2. When they reach approximately the top of the cylinder, the beans will drop again to the bottom of the pocket. Due to the forward downward tilt of the cylinder, a percentage of the beans will drop into the next bean pocket. This is approximately one-third of the mass of beans. However, this percentage of beans may be adjusted by the tilt of the cylinder. In this manner the beans will progress through the machine from inlet end to outlet end. As each mass of beans is carried upwardly in the bean pocket, the ends of the beans which project through the bean openings in the sections will come in contact with the diagonally arranged cutting edge of the first knife and will be snipped off. As the beans in the pocket travel past the first knife they will be in constantly shifting motion so that new bean ends will be presented to new portions of the slot, will project therethrough and will be snipped off by the succeeding knives of the series. In other words, the beans in the traveling pockets are in a constant state of individual shifting movement, but in general are carried in mass formation in a circular path of travel upwardly in order forwardly to feed the beans through the machine. As hereinbefore stated, the direct passage of any particular bean is prevented by the fact that the inner edges of the partitions or collars forming the bean pockets are out of registration.

The bean pockets are two inches wide. Each bean pocket for ideal working conditions will contain approximately 150 beans, depending of course upon the size of the beans, this width bean pocket applies to a No. 3 bean. It will be appreciated of course that, due to the mass of falling beans which fall in different positions some end foremost and some flat-wise, when the beans strike the next forward pocket those beans which fall end foremost into the zig-zag slots will be generally held in such position by those beans which lie flat-wise or cross-wise in the pocket until the snipping operation is carried out. Therefore, by my invention, and particularly by the new method of feeding the beans forwardly in mass formation and pocketing them to drop in mass formation into the next bean pocket, I am enabled thus to hold the beans in snipping position by means of the beans themselves and thus eliminate any lifting ribs or bars which heretofore have been provided on the inside wall of the pocket itself or the inside wall of the bean receiving slots.

It will be noted by reference to Fig. 7 that the width of a bean pocket is considerably less than the width of the ordinary standard bean, and by this arrangement the beans will gradually assume positions within each pocket wherein the beans tend to lie with their axes somewhat parallel to the side plates, so that during the rotation of the drum, when the beans drop by gravity, as shown by the full arrowed line in Fig. 2, a percentage of them tend to be dumped end foremost into the next forwardly disposed bean pocket. Hence, during the initial progress of the first batch of beans through the machine, a maximum number of bean ends will be presented to the slots, and further, that by reason of the inclined or sloping side walls of the slots, as shown in Fig. 6, these bean ends will be directed or guided into the slots.

Changes may be made in the form, construction and arrangement of parts without departing from the spirit of the invention or sacrificing any of its advantages, and the right is hereby reserved to make all such changes as fairly fall within the scope of the following claims.

Having thus described my invention, what I claim as new and desire to obtain by Letters Patent of the United States is:

1. In a bean snipper, the combination of a turnable drum, the inner peripheral walls of said drum having a plurality of separate, axially spaced apart, inwardly extending partitions, said partitions being arranged in different planes and extending substantially along the length of the drum, the innermost edges of said partitions forming a continuous opening about the central axis of said drum, means for supporting said drum at an angle to the horizontal, means for feeding a mass of string beans into said drum whereby said mass will lie in a pocket formed by a pair of such spaced apart plates, and means for turning said drum whereby to cause the upward movement of the mass of beans in said pocket and whereby to permit a portion of said beans in elevated position to drop through the central opening into the next adjacent pocket and so on, whereby to cause the travel of the beans through the drum, said partitions being so spaced as to tend to arrange the falling beans in radial position relative to the drum.

2. In a bean snipping machine, the combination of a rotatable cylinder disposed with its axis inclined from a horizontal plane, the in-feed end of the drum being disposed higher than the discharge end of the drum, means for feeding a mass of beans into the in-feed end of the drum, said drum being provided with a series of internal circular baffles comprising circular, flat, transverse plates, whereby to partition said drum into a series of separate, transversely extending circumferential pockets, the inner edges of said partition means terminating short of the central longitudinal axis of the drum to provide a relatively large central communicating opening from one pocket to another pocket, the continuous circumferential wall of said drum being provided with openings to permit the projection of beans therethrough, cutting means adapted to cut the projecting ends of said beans upon movement of said drum, and means for turning said drum whereby to cause the mass of beans in a pocket to move in a circular path upwardly to an elevated position, from which position a percentage of said beans will drop directly by gravity into the next forwardly positioned circular pocket, whereby the beans in such fashion will be fed by gravity from pocket to pocket through the cylinder, said partitions being so spaced as to tend to arrange the falling beans in radial position relative to the drum.

3. In a bean snipping machine, the combination of a turnable cylinder disposed with its longitudinal axis inclined from the horizontal plane with the in-feed end of the cylinder raised above the out-feed end, means disposed in the cylinder providing a plurality of individual annular pockets about the inner periphery thereof, said pockets being provided with inter-communicating openings disposed at the central axis of the turnable cylinder, said pockets being relatively narrow and arranged in contacting series longitudinally of the drum, means for turning said cylinder through an arc of approximately 180 degrees, whereby to cause a mass of beans in a pocket to move in a circular path upwardly and to fall by gravity into the next adjacent pocket, and whereby the beans are fed forwardly by gravity pocket by pocket through the machine, each of said pockets having its wall portion provided with openings through which the ends of the beans may project, and means acting to snip off the ends of said beans.

4. In a bean snipping machine, the combination of means for holding a mass of beans, means for moving the holding means in a circular upwardly extending path of up to 180 degrees arranged in a flat plane inclined to the vertical, means for permitting a portion of said beans to drop by gravity to a second holding means, means for causing said second holding means to move in a circular upwardly extending path of up to 180 degrees, said path extending laterally of and parallel to the first mentioned circular path, whereby a portion of the mass of beans is moved or fed laterally, and means for snipping off the ends of certain of said beans during their movement along said circular path of travel.

5. In a bean snipping machine, the combination of a rotating cylinder including a plurality of spaced apart, closed collars having their central portions opening to provide a relatively large hollow bean passage through the central portion of the cylinder, the inner edges of each adjacent collar being eccentrically disposed to the inner edges of the next adjacent collar, whereby to provide a series of parallel bean pockets, said cylinder being tilted from the horizontal with the in-feed end raised above the discharge end, means for rotating said cylinder, means for feeding beans into the in-feed end of the cylinder and for discharging beans from the discharge end of said cylinder, the circumferential wall of each circular pocket being provided with a plurality of openings through which the ends of the beans may project, and means for snipping off the ends of the beans which project during the movement of said cylinder.

6. A bean snipping machine having a bean positioning slot of wavy or substantial zig zag form of generally uniform cross section, whereby to hinder accommodation of a bean lengthwise, and a knife to snip the ends of the beans so positioned.

7. A bean snipping machine having a bean positioning slot of wavy or substantial zig zag form of generally uniform cross section, the inner side walls of the slot being inclined to direct the ends of the beans into said slot, and a knife operable across the plane of the slot to snip the ends of the beans so positioned.

8. A bean snipping machine having an elongated opening of substantially uniform width sufficient to position the end of a bean for snipping, the longitudinal edges of the opening departing from a straight line whereby to prevent the side walls of a bean lying in said opening projecting therethrough, means to direct beans to said opening, and a knife to snip the ends of the beans so positioned.

9. In a bean snipping machine, the combination of means providing a bean carrying member having an elongated slot of wavelike contour, said slot being of substantially uniform width, a stationary cutting knife having its cutting edge diagonally disposed with respect to the outer wall of said slot, and means for moving said slotted bean carrier past said knife to effect a slicing action of a knife on a bean end projecting through said slot.

10. In a bean snipping machine, the combination of means forming an arcuate bean pocket of substantial length as compared to its width, the arcuate wall of said bean pocket being provided with a plurality of elongated slots of wavelike formation, the width of said slots being uniform, said slots extending parallel to the length of said pocket, a plurality of spaced apart knives disposed with their cutting edges diagonally to the length of the bean pocket, and means for moving said bean pocket parallel to its length and substantially about 180 degrees of travel whereby to cause the mass of beans to move in a circular path and successively past the series of knives.

11. A bean snipping machine having a movable bean carrier adapted to receive a mass of beans, said bean carrier being provided with an opening through which a bean end may project, the outside wall of said bean carrier adjacent said opening being formed to provide a surface over which a knife may freely slide, means for moving said bean carrier to carry a bean end projecting through said opening in a predetermined path of movement, and a slicing knife stationarily disposed with its cutting edge lying in contact with said outside surface and disposed diagonally to the path of movement of said projecting bean end, said knife being mounted upon a resilient strap fixed to the frame and normally resiliently pressing said knife against said slidable surface of said bean carrier, said resilient strap being so arranged and proportioned as to permit the knife to move resiliently in a direction transverse to the path of the movement of the projecting beans when contacted thereby.

12. In a bean snipping machine the combination of a traveling bean carrier adapted to contain a mass of beans, said bean carrier having an arcuate surface provided with a series of elongated slots wave-like in cross-section through which a plurality of bean ends may simultaneously project, said slots extending parallel to the path of movement of the bean carrier and said slots being disposed in parallel spaced relation transversely to the path of movement of the bean carrier, means for moving said bean carrier in a predetermined path, a slicing knife stationarily mounted with its cutting edge disposed diagonally to the path of movement of said bean carrier, said cutting edge being of sufficient width to extend completely across the path of movement of said plurality of slots whereby to provide a slicing snipping action simultaneously on a plurality of beans both longitudinally in direction and transversely in direction of the path of movement of the bean carrier.

13. In a bean snipping machine, the combination of a rotatable cylinder having a plurality of transverse partitions, each partition extending in a different plane and forming an axially adjacent series of separate pockets, communicating openings in said partitions, means for rotating said cylinder whereby to cause a mass of beans to be carried upwardly in a pocket, means to cause at least a portion of said mass of beans to fall into an adjacent axial pocket, said pockets having wall portions provided with openings through which the ends of the beans may project, and means acting to snip off the bean ends, said partitions being so spaced as to tend to arrange the falling beans in radial position relative to the drum.

14. In a bean snipping machine, the combination of a rotatable cylinder having a plurality of transverse partitions arranged in spaced parallel planes and forming an axially adjacent series of pockets, communicating openings in said partitions, means for rotating said cylinder whereby to cause a mass of beans to be carried upwardly in a pocket, means to cause at least a portion of said mass of beans to fall into an adjacent axial pocket, said pockets having wall portions provided with openings through which the ends of the beans may project, and means acting to snip off the bean ends, said communicating openings being disposed in staggered relation, said partitions being so spaced as to tend to arrange the falling beans in radial position relative to the drum.

15. A bean snipping machine having a bean positioning slot of generally uniform width and having a crooked longitudinal configuration of such shape as to hinder the accommodation of a bean lengthwise, and a knife operable across the plane of the slot to snip the ends of the beans so positioned.

JOE RICHARD URSCHEL.